United States Patent
Barile et al.

(10) Patent No.: US 8,356,357 B1
(45) Date of Patent: Jan. 15, 2013

(54) DETECTING TAINTED DOCUMENTS BY TRACKING TRANSFORMED CONFIDENTIAL DATA

(75) Inventors: Ian Barile, Mountain View, CA (US); Timothy Wyatt, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 838 days.

(21) Appl. No.: 12/512,911

(22) Filed: Jul. 30, 2009

(51) Int. Cl.
*G06F 21/00* (2006.01)
(52) U.S. Cl. .............................. 726/26; 705/51; 707/694
(58) Field of Classification Search .................. 726/26; 705/51; 707/694
See application file for complete search history.

(56) References Cited

U.S. PATENT DOCUMENTS

| | | | |
|---|---|---|---|
| 7,043,553 B2 * | 5/2006 | Monsen et al. | 709/229 |
| 7,594,277 B2 * | 9/2009 | Zhang et al. | 726/30 |
| 7,788,235 B1 * | 8/2010 | Yeo | 707/687 |
| 8,065,739 B1 * | 11/2011 | Bruening et al. | 726/26 |
| 8,131,677 B2 * | 3/2012 | Hsu | 707/626 |
| 8,181,033 B1 * | 5/2012 | Paul et al. | 713/187 |
| 8,181,036 B1 * | 5/2012 | Nachenberg | 713/189 |
| 2009/0049515 A1 * | 2/2009 | Hsu | 726/1 |
| 2009/0158430 A1 * | 6/2009 | Borders | 726/23 |
| 2010/0043047 A1 * | 2/2010 | Archer et al. | 726/1 |

FOREIGN PATENT DOCUMENTS

WO WO2005/026874 A2 * 3/2005

OTHER PUBLICATIONS

Borders ("Protecting Confidential Information from Malicious Software", PhD dissertation for the Computer Science and Engineering Department, University of Michigan, Apr. 30, 2009, 135 pages).*
"McAfee Data Loss Prevention Best Practices Guide," White Paper, McAfee, Inc., Sep. 2007, 13 pages.

\* cited by examiner

*Primary Examiner* — James D Nigh
(74) *Attorney, Agent, or Firm* — Fenwick & West LLP (57) ABSTRACT

Tainted files suspected to contain confidential data that are inaccessible to Data Loss Prevention (DLP) applications are detected and tracked on computers. An access detection module detects that an application has accessed a file that contains confidential information. A transformation detection module that the application wrote a transformed file that contains content inaccessible to the DLP application, where the transformed file is suspected to contain at least a portion of the confidential information. A signature module generates a signature for the transformed file containing the inaccessible content. The signature is stored in a signature database containing a plurality of signatures of transformed files. A comparison module compares the signature generated to files transmitted via a network, wherein the transmitted files contain content inaccessible to the DLP application. A transformed file detection module detects that matched file is the transformed file in response to a comparison indicating that the signature matches a file transmitted via the network.

20 Claims, 6 Drawing Sheets

DETECTING TAINTED DOCUMENTS BY TRACKING TRANSFORMED CONFIDENTIAL DATA

BACKGROUND OF THE INVENTION

1. Field of the Invention

This invention pertains in general to computer security, and more specifically to detecting confidential data that has been transformed to evade detection.

2. Description of the Related Art

The environments in which employees of a company work have changed dramatically over the years. Employees now commonly have mobile devices, including laptop computers and other devices, that make it possible for them to work remotely and communicate with one another from almost anywhere. Company data is constantly being accessed and shared by employees all over the world. Enhanced mobility and improved communication channels have revolutionized the way companies function.

Yet, with these mobility and communication enhancements come increased risks that sensitive or proprietary information can be unintentionally or maliciously transmitted outside of the company. Authorized users can accidentally send out confidential information or otherwise compromise sensitive data when communicating with other users. Similarly, malicious users from within the company or outside can intentionally transmit company proprietary data outside of the company network for unauthorized use. In either case, the company suffers a loss due to the potential exposure of its confidential data, including a possible loss of intellectual property rights, a risk of lawsuits due to release of a client's private data, a threat of malicious usage of the data against the company or its clients, and many other troubling possibilities.

Given the immensity of the problems associated with loss of confidential data, it is essential that companies prevent these types of losses. Data loss prevention (DLP) products are one mechanism for curbing data loss. DLP products have a number of mechanisms for identifying confidential information (e.g., deep content analysis, including using dictionaries, keywords, or regular expressions, using partial document fingerprinting, etc.). Network DLP products or gateway-based solutions generally run on a company's internet network connection, and analyze network traffic for transmissions of confidential data. Host-based DLP products run on end-user workstations or company servers, and manage information flow between users, including controlling email and other communications.

While generally effective for data loss prevention, DLP products typically cannot detect confidential data that has been transformed to evade detection. DLP products perform an analysis on text and can crack well known file formats to extract textual information from files. However, transformations of data that are unknown or not easily reversed can make files inaccessible to DLP products by encrypting or otherwise protecting all or part of the files' content from being read or interpreted, thereby evading the desired analysis by DLP products. Password file encryption, for example, or even a simple XOR encryption, can make a file inaccessible to DLP applications. This leaves substantial holes in the standard DLP solutions that allow users to transform and thus hide confidential data, which the user can then easily transmit outside of the company without DLP detection.

Therefore, there is a need in the art for a solution that controls transmission of transformed data outside of a company to prevent release of confidential data.

DISCLOSURE OF INVENTION

The above and other needs are met by a computer-implemented method, computer system, and computer program product or computer-readable storage medium for detecting and tracking transformed files suspected to contain confidential data that are inaccessible to Data Loss Prevention (DLP) applications. An embodiment of the method comprises detecting that an application has accessed a file that contains confidential information. The method further includes detecting that the application wrote a transformed file that contains content inaccessible to the DLP application, where the transformed file is suspected to contain at least a portion of the confidential information. The method also includes generating a signature for the transformed file based on the inaccessible content. The signature is stored in a signature database containing a plurality of signatures of transformed files. The method further comprises comparing the signature generated to files transmitted via a network, wherein the transmitted files contain content inaccessible to the DLP application. In addition, the method comprises detecting that matched file is the transformed file in response to a comparison indicating that the signature matches a file transmitted via the network.

In an embodiment of the system, an access detection module detects that an application has accessed a file that contains confidential information. A transformation detection module that the application wrote a transformed file that contains content inaccessible to the DLP application, where the transformed file is suspected to contain at least a portion of the confidential information. A signature module generates a signature for the transformed file containing the inaccessible content. The signature is stored in a signature database containing a plurality of signatures of transformed files. A comparison module compares the signature generated to files transmitted via a network, wherein the transmitted files contain content inaccessible to the DLP application. A transformed file detection module detects that matched file is the transformed file in response to a comparison indicating that the signature matches a file transmitted via the network.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
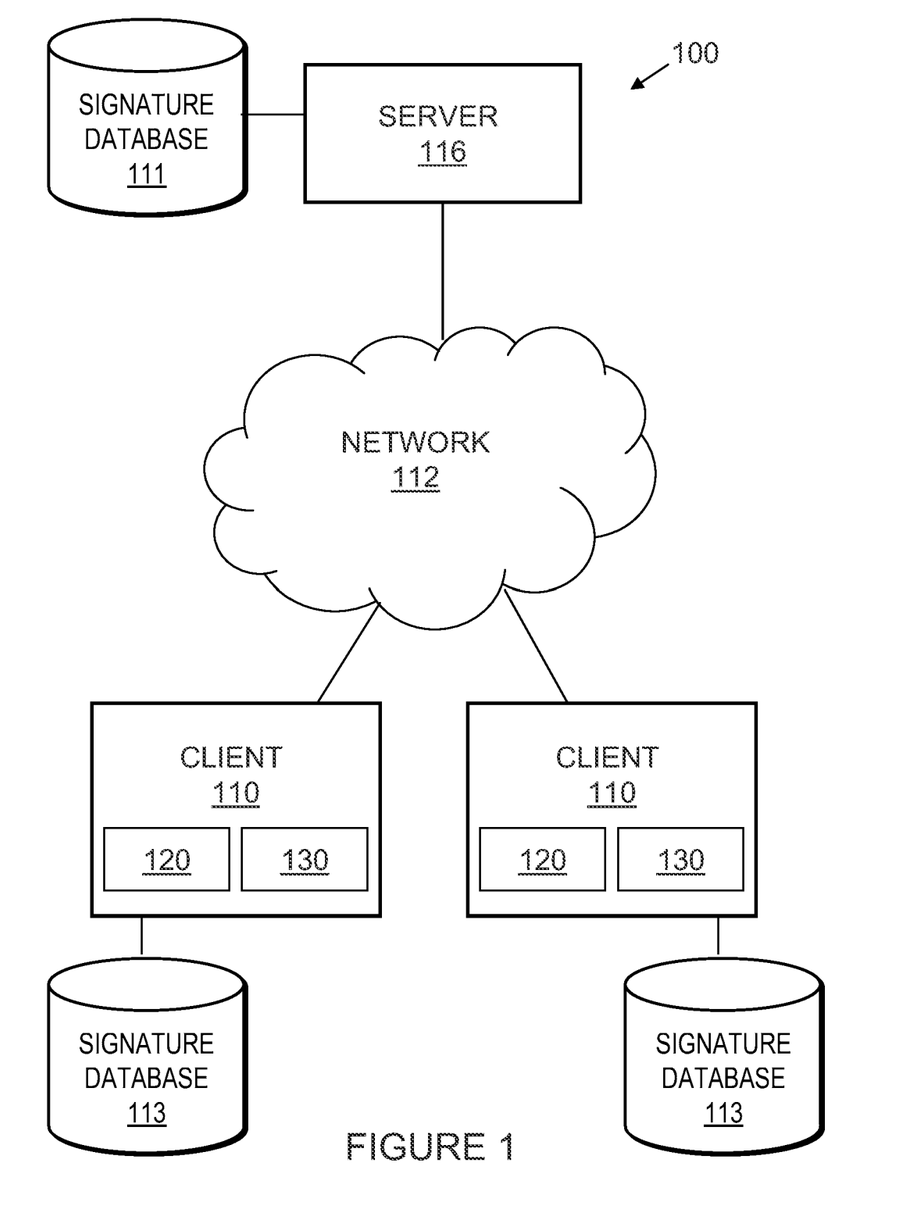
FIG. 1 is a high-level block diagram illustrating an example of a computing environment 100, according to one embodiment of the present invention.

FIG. 1 is a high-level block diagram illustrating a computing environment 100 according to an embodiment. FIG. 1 illustrates a server 116 and clients 110 connected by a network 112. Only two clients 110 are shown in FIG. 1 in order to simplify and clarify the description. Embodiments of the computing environment 100 can have thousands or millions of clients 110, as well as multiple servers 116. In some embodiments, the clients 110 are only connected to the network 112 for a certain period of time or not at all.

The server 116 serves information or content to client computers 110 via the network 112. In one embodiment, the server 116 is located at a website provided by SYMANTEC CORPORATION, although the server can also be provided by another entity. The server 116 can include a database storing information (e.g., signature database 111) and a web server for interacting with clients 110. The server 116 can send information (e.g. signatures) stored in the signature database 111 across the network 112 and to the clients 110. For example, the server 116 can provide signatures stored in the signature database 111 to clients 110 for detection of transformed files. One or more of the functions of the server 116 can also be executed on the client 110 or in a cloud computing environment.

The clients 110 are computers or other electronic devices used by one or more users 110 that can interact with the server 116 or other clients 110. The clients 110, for example, can be personal computers executing a web browser that allows the user to browse and search for information available at a website associated with the server. In other embodiments, the clients 110 are network-capable devices other than a computer, such as a personal digital assistant (PDA), a mobile telephone, a pager, a television "set-top box," etc. The clients 110 preferably execute an operating system (e.g., LINUX®, one of the versions of MICROSOFT WINDOWS®, and PALM OS®), which controls the operation of the computer system, and execute one or more application programs. The clients 110 can perform activities and make requests for or otherwise acquire information (e.g., signatures) from the server 116 or other computers. For example, the clients 110 can detect transformed files with signatures provided by the server 116. In some embodiments, the clients 110 have a local signature database 113 in which signatures of transformed files suspected to contain confidential data are stored.

The network 112 enables communications among the entities connected to it. In one embodiment, the network 112 is the Internet and uses standard communications technologies and/or protocols. Thus, the network 112 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 116 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 112 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

In the embodiment illustrated in FIG. 1, the clients 110 execute a security module 120 for detecting and tracking transformed files suspected to contain confidential data and protected from access by Data Loss Prevention (DLP) applications. The clients can also execute a detection module 130 for detecting transmission from a computer of transformed files suspected to contain confidential data that are inaccessible to DLP applications. The modules 120, 130 can be discrete application programs, or the modules 120, 130 can be integrated into another application program or the client's 110 operating system. In some embodiments, one or both of the modules 120, 130 are included in a DLP application or with a suite of DLP products. In some embodiments, a portion or all of either or both of the security module 120 and the detection module 130 is executed on the server 116 or in a cloud computing environment.

In brief summary, the security module 120 detects that a file containing confidential information has been accessed by an application. The module 120 further detects that the application has then written an output file that contains content inaccessible to the DLP application. Since the application may have transformed confidential information into an inaccessible format written to the output file, the application is considered to have performed a transformation on the file containing confidential information, thus generating a transformed file that is inaccessible to DLP applications. The transformed file is suspected to contain at least a portion of the confidential information from the original file. The module 120 can then generate a signature for the transformed file based on the scanned contents. The signature is stored in a signature database containing a plurality of signatures of transformed files. The module 120 then tracks the transformed file on the client 110 (or other computer/server 116) as it is accessed and potentially modified by other applications over a period of time. The security module 120 will be described in more detail below.

In brief summary, the detection module 130 detects attempts to transmit via a network transformed files that are inaccessible to DLP applications. The module 130 compares the signature generated to files being transmitted and detects that one of the files being transmitted is the transformed file in response to a positive comparison. As used herein, the term "transformation" or "transforming" of a file refers to accessing a file and then writing an output file that contains sections written in a way that prevents a DLP application from determining if the output file contains confidential data, including encrypting, enciphering, password-protecting, hidden watermarking, etc. the file, transferring some or all of the contents of the file to another file that is encrypted/enciphered/password-protected, placing the file in an encrypted/enciphered/ password protected container or .zip file, and so forth). As used also herein, the term "confidential data" or "confidential information" refers to any data that an entity, such as a company, wishes to protect from viewing or access by others, whether the others be within the company or not, including proprietary data, trade secret information, company private data, or various other types of sensitive data (e.g., financial information, medical information, or other personal data). The detection module 130 will be described in more detail below.

The two modules 120, 130 protect computers against loss of confidential data that has been transformed to evade detection. As explained above, current DLP products do an analysis on text and can crack well-known file formats to extract the textual information from files for analysis. Any transformation that is unknown or cannot be detected can be used to evade DLP products, even a simple XOR. If a user wants to transform data and send it across the network, it is impossible for current DLP products to detect confidential data inside of the file because of the unlimited number of transforms that can be applied to the file. For example, if a user tries to send confidential data and is blocked by a network DLP product, the user can try adding the file to a password-protected container file, such as a .zip file created using WINZIP®, or can password protect the document (e.g., a MICROSOFT® WORD document). The document can now be transmitted without detection by current DLP products. Further, network DLP products, in particular, have no way to determine what may have happened to a file transformed locally on a client 110, so such products will not detect the transformed file. The modules 120, 130 allow for tracking and detection of these types of transformed files potentially containing confidential data to prevent their transmission.

Figure 2:
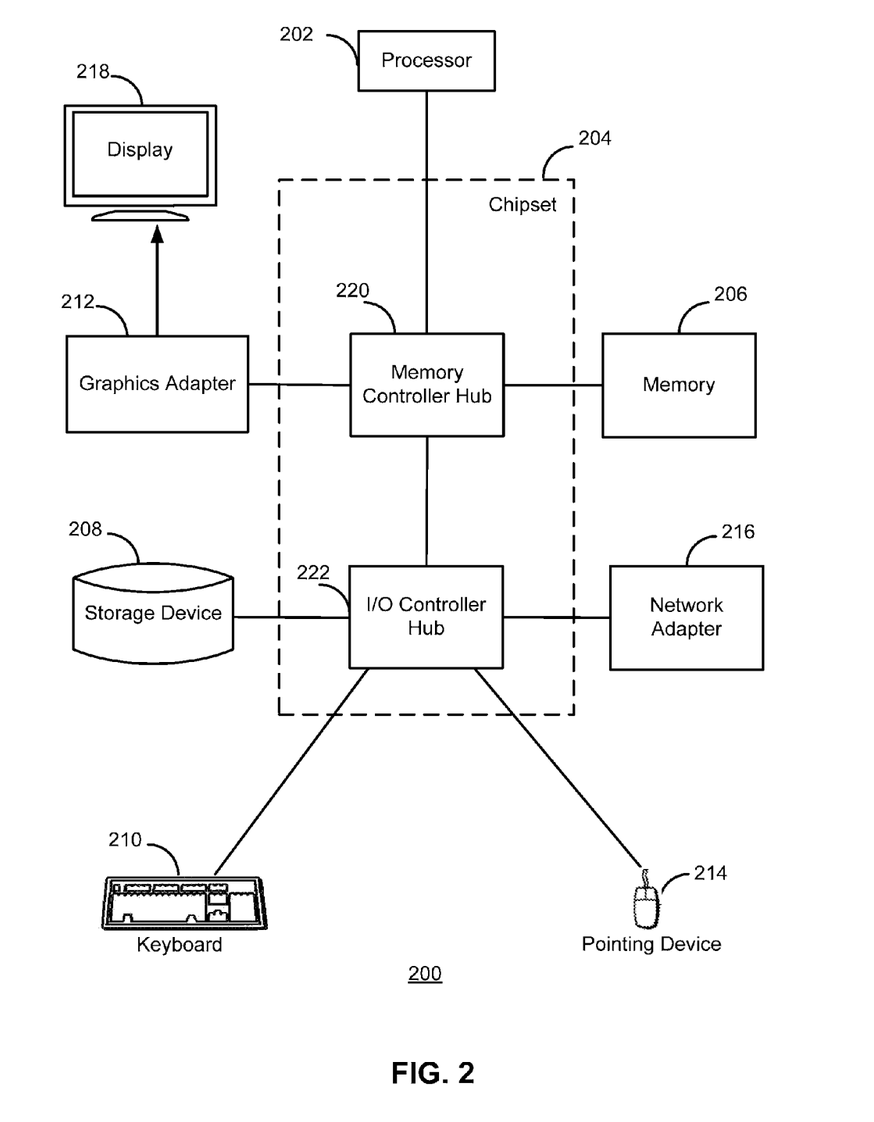
FIG. 2 is a high-level block diagram illustrating a computer system 200 for use with the present invention.

FIG. 2 is a high-level block diagram illustrating an example of a computer 200 for use as a server 16 and/or client 110. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 116. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a client 110 that is a mobile telephone typically has limited processing power, a small display 218, and might lack a pointing device 214. The server 116, in contrast, may comprise multiple blade servers working together to provide the functionality described herein.

Figure 3A:
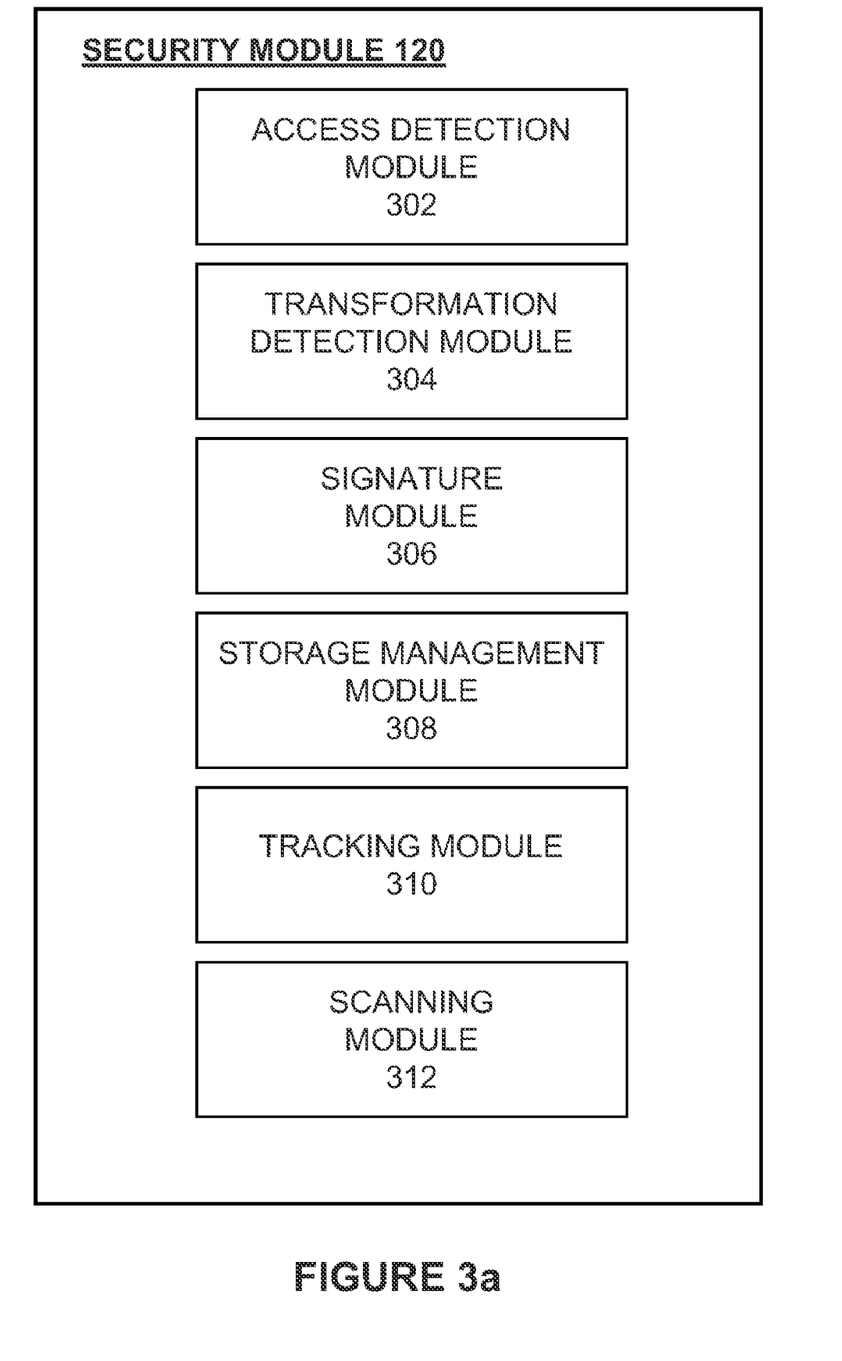
FIG. 3a is a high-level block diagram illustrating the functional modules within the security module 120, according to one embodiment of the present invention.

FIG. 3a is a high-level block diagram illustrating the functional modules within the security module 120, according to one embodiment of the present invention. The security module 120, in the embodiment illustrated in FIG. 3a, includes an access detection module 302, a transformation detection module 304, a signature module 306, storage management module 308, a tracking module 310, and a scanning module 312. Some embodiments of the security module 120 have different and/or additional modules than those shown in FIG. 3a and the other figures. Likewise, the functionalities can be distributed among the modules in a manner different than described herein. Certain modules and functions can be incorporated into other modules of the security module 120 and/or other entities on the network 112, including the server 116. The same is true for FIG. 3b.

In some embodiments, the access detection module 302 detects that an application has accessed a file that contains confidential information. The application can be any type of application that can perform a transformation or otherwise block a file from access. For example, some MICROSOFT® OFFICE applications allow a user to add password protection to a file. Similarly, a file can be placed in a container file, such as a .zip file that can be created by WINZIP®, which can be password-protected. Numerous other applications can also block access to files in a variety of ways, and the accessing of a file by these applications can be detected by module 302. Thus, the module 302 can detect that WINZIP®, for example, has opened a file containing confidential data. In some embodiments, the module 302 can detect that an application has opened a file and has opened a second file for writing (e.g., a second file into which a portion of the first file may have been copied or written, or into which the entire first file may have been placed, etc.).

The access detection module can 302 determine that the file contains confidential data in a number of ways. In some embodiments, the module 302 determines that the file contains confidential data from a DLP application executed on or associated with the client 110 (or other computer/server 116). Thus, the DLP application can determine that the file contains confidential information, and can notify the module 302 of this. In other embodiments, the module 302 can itself determine that the file contains confidential data.

The transformation detection module 304 detects that the application wrote a transformed file that contains content inaccessible to DLP applications, and the transformed file is suspected to contain at least a portion of the confidential information. As explained above, this transformed file can be an encrypted/password-protected version of the original file, a container file into which the original file is placed that is encrypted/password-protected, a second file into which the original file or a portion of it was potentially copied which is encrypted/password-protected, and so forth. The module 304 can thus detect that the original file having the confidential data has potentially been converted to a password-protected or encrypted file that is inaccessible to DLP applications or that the file has potentially been copied to a password-protected or encrypted container file which is inaccessible to DLP applications. A local incident will not be created by the DLP application when such a file transformation occurs since the user did not violate any business policies regarding confidential data. Some files may be correctly password-protected for storage in the company on a network driver to keep others from reading the document. Thus, the DLP application will not likely detect the transformed file as a file containing confidential data or a file for which any violations have been made.

In some embodiments, the transformation detection module's 304 detection of a transformation on the file includes detecting that the file is no longer accessible after the transformation even though the module 304 does not know exactly what transformation has been performed on the file. Further, as explained above, the access detection module 302 can detect that an application opened a file containing confidential data and a second file for writing. Thus, the transformation detection module's 304 detection can include detecting that the application has read the file containing confidential data and detecting that a number of writes occurred to the second file while the original file was open. This thus suggests that the application may have written some of the content of the original file to the second file and so the second file may now contain at least some of the confidential data. In some embodiments, the module 304 detects that the application has read the entire file (e.g., read the file from offset 0 to the end of the file). In other embodiments, the module 304 detects that the application has read a portion of the file. In some embodiments, the module 304 detects any writing to the second file by the application. In other embodiments, the module 304 detects when the application has done a significant number of writes, or a number over some specified threshold number of writes. The threshold number of writes for detection can vary for different applications.

In some embodiments, entropy can be used as a method to check transformed files created by an application to determine if the file has been encrypted or otherwise obfuscated. This entropy analysis can apply a mathematical approach to a file to determine if it is an encrypted file.

As stated above, the transformed file created is suspected to contain at least a portion of the confidential information. Though the transformation detection module 304 may not know what confidential data is contained in the transformed file, if any, the module 304 knows that the transformed file is suspected to contain at least a portion of the confidential data in the original file. Thus, the transformed file is one that should be tracked as possibly containing confidential information.

In some embodiments, application profiling is conducted on various applications to learn about the transformations that can be performed with that application. Applications known to have the capability to do transformations on files that might make them undetectable by DLP applications can be examined in detail. The resultant files can be monitored to determine what the files look like, how they are treated, etc. Using this information, the module 304 can better detect transformations created by different applications, and the transformed files can be more easily tracked.

The signature module 306 generates a signature for the transformed file based on the inaccessible content. In one embodiment, the module 306 generates a signature by taking a hash of the transformed file, such as a Message-Digest algorithm 5 (MD5) hash or a Secure Hash Algorithm (e.g., SHA-1) hash. While the signatures can be hash-based, they can also be string-based (i.e., a signature based on a short, contiguous sequence of bytes from a malware binary), or activity-based (i.e., a signature based on known malware-specific activities).

The storage management module 308 stores the signature in a signature database containing a plurality of signatures of transformed files. The signature can be stored in a local signature database, such as signature database 113 associated with the clients 110. The signature can also be stored in a central database, such as signature 111 associated with the server 116. In some embodiments, the central database is accessible by many clients 110 or DLP applications associated with those clients. In some embodiments, the module 308 provides the signature to another entity (e.g., to a DLP application associated with the computer) for storage locally in the signature database 113. The module 308 can also transmit the signature for storage in a central database (e.g., by a DLP application on the server 116 or a network DLP application).

The tracking module 310 tracks the transformed file for which the signature was generated. In some embodiments, the module 310 can detect the transformed file over a period of time, as it is accessed by various applications or moved around on the computer. The module 310 can further detect and track additional modifications to made to the transformed file. For example, if the file is segmented or otherwise divided into pieces, the signature module 306 can create signatures for the various pieces and the module 310 can track the pieces. If a different or additional transformation is performed on the transformed file or if the transformation is modified, the module 310 can track the modified file and additional signatures can be taken of each new or modified file by the module 306 or the transformations can otherwise be recorded for the file by the tracking module 310. Thus, the module 310 can update signatures or historical information tracked regarding each transformed file over time as the file is accessed or modified.

The scanning module 312 scans the contents of the transformed file if the contents become available (e.g., if the file is opened by the application or by a different application). For example, if at some point the access detection module 302 detects that an application has opened the transformed file, the scanning module 312 can then scan the contents of the transformed file while open to determine whether the transformed file really does contain confidential data. The module 312 can scan all or a portion of the file. In some embodiments, this scan is performed by a DLP application and the module 312 determines from the DLP application whether or not confidential data is present. If confidential data is not present in the file, the tracking module 310 can remove the signature for the transformed file from the signature database or can otherwise record for the file that the file does not contain confidential information.

Figure 3B:
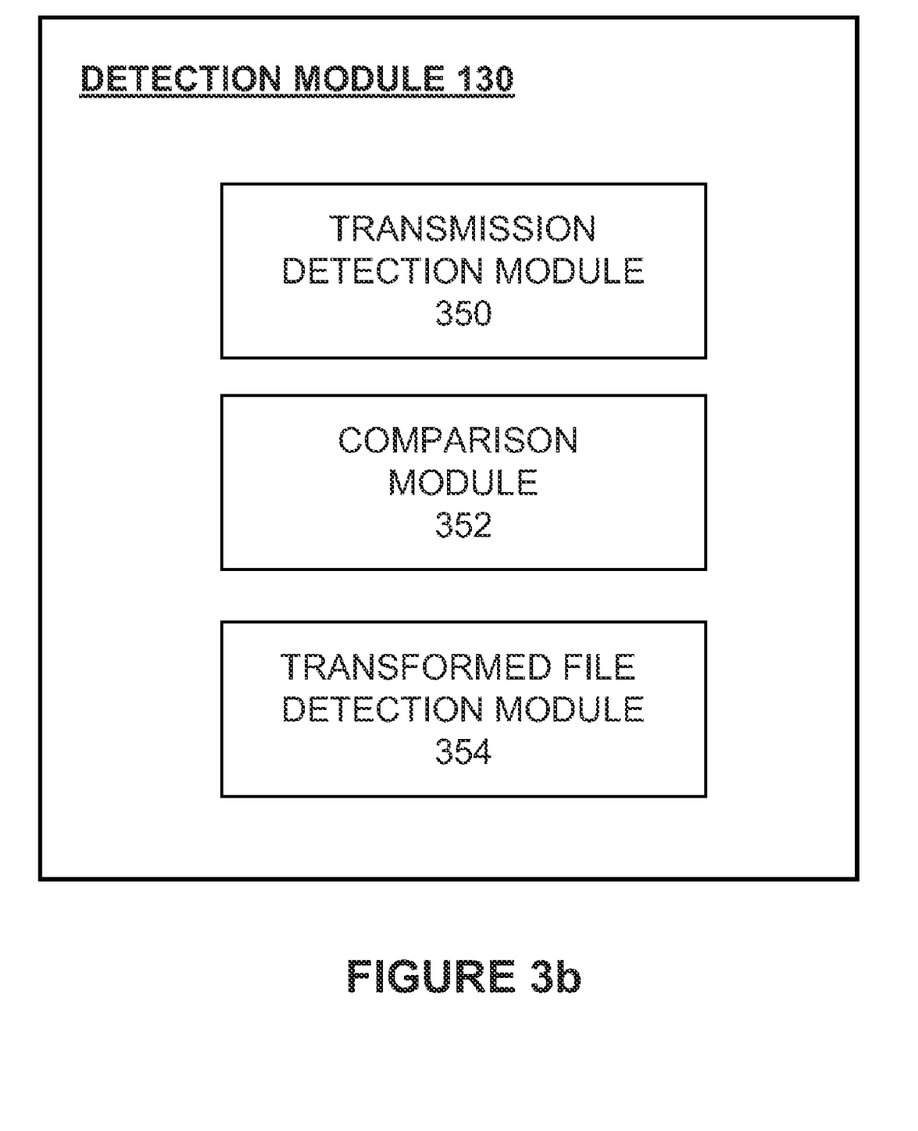
FIG. 3b is a high-level block diagram illustrating the functional modules within the detection module 130, according to one embodiment of the present invention.

FIG. 3b is a high-level block diagram illustrating the functional modules within the detection module 130, according to one embodiment of the present invention. The detection module 130, in the embodiment illustrated in FIG. 3b, includes a transmission detection module 350, a comparison module 352, and a transformed file detection module 354.

The transmission detection module 350 detects an attempt to transmit via the network 112, a file that cannot be accessed by a DLP application associated with the client 110 (or other computer/server 116). This file being transmitted may be a transformed file for which a signature could have been taken and stored in a signature database 111, 113. The module 350 can thus detect that the file is being or has been sent and detect that the DLP applications cannot access the file. In one embodiment, the computer from which the transmission attempt of the transformed file is being made is the same computer on which the transformation of the file occurred. In another embodiment, the computer on which the transmission attempt is made is a different computer from the one on which the transformation of the file occurred. Thus, the detection of the transmission can occur on any client 110 (or other computer/server 116).

The comparison module 352 compares the signature generated to files transmitted via a network, where the transmitted files contain content inaccessible to the DLP applications. In one embodiment, the module 352 matches the files against signatures (e.g., hashes of transformed files) in the local signature database 113. In another embodiment, the module matches the files against signatures in a central database or a database associated with server 116, such as signature database 111. Thus, when the module 350 detects that a file is being transmitted, the module 354 can compare that file to signatures in either or both of the local and central databases.

The transformed file detection module 354 detects that one of the files being transmitted is the transformed file in response to a positive comparison by the comparison module 352. Thus, based on the comparison by module 352 of the file being sent with the database(s) of signatures for transformed files, the module 354 can determine if the file is a transformed file, and so is suspected to contain confidential data. Where the module 354 detects that the file is a transformed file, the module 354 can take action or can notify a DLP application of the problem, and the appropriate policy can be applied regarding that file suspected to contain confidential data. Where a negative comparison is made (by comparison module 352) between the file being sent and the stored signatures, the module 130 detects that the file being transmitted is not a transformed file. This file does not likely contain confidential data. Thus, sending of the file can be permitted.

Since the transformed file signatures can be stored in a central database that is accessible by many clients 110 or DLP applications associated with those clients, signatures for transformed files detected on multiple computers can be collected. In this manner, a transformed file that was transformed on one computer can still be detected on another computer using these signatures. For example, where a file is sent from computer A, and a DLP product (e.g., an endpoint DLP network scanner) cannot crack the file, the file is checked against the signatures or hashes of transformed files. If the file matches a signature, the file may contain confidential data, and the appropriate data management policy is applied to that file. As another example, where a file on computer A is moved by a user to computer B and is then sent from computer B (which has no way to know that it was transformed), the DLP products will again fail to access the file. However, the file will still be compared against the signatures of the database(s). Since a signature of the transformed file should have been stored by computer A in the central database before the file was moved to computer B, the file can still be detected upon sending out from computer B based on the signatures of the central database. Similarly, even where computer B is a computer that does not run a DLP application, the file can still be detected based on signatures stored in the central database.

As explained above, in some embodiments, all or a portion of the modules described above are incorporated into a DLP application or included with a DLP suite of products. In addition, in some embodiments, all or a portion of the modules described above are incorporated into a server, such as server 116. For example, the modules of the security module 120 might be executed locally on a client 110 for signature generation, where the signatures created are stored locally and in a central database. In this example, the detection module 130 can be executed on a different client 110 (to detect a file being transmitted from that client) or on a server 116, such as a company server, that performs detection of files being transmitted internally in the company or to the outside world using the central database of signatures. Similarly, the detection module 130 can be associated with a network DLP that runs on a company Internet connection to detect transmission of transformed files using local or central signature databases.

Figure 4:
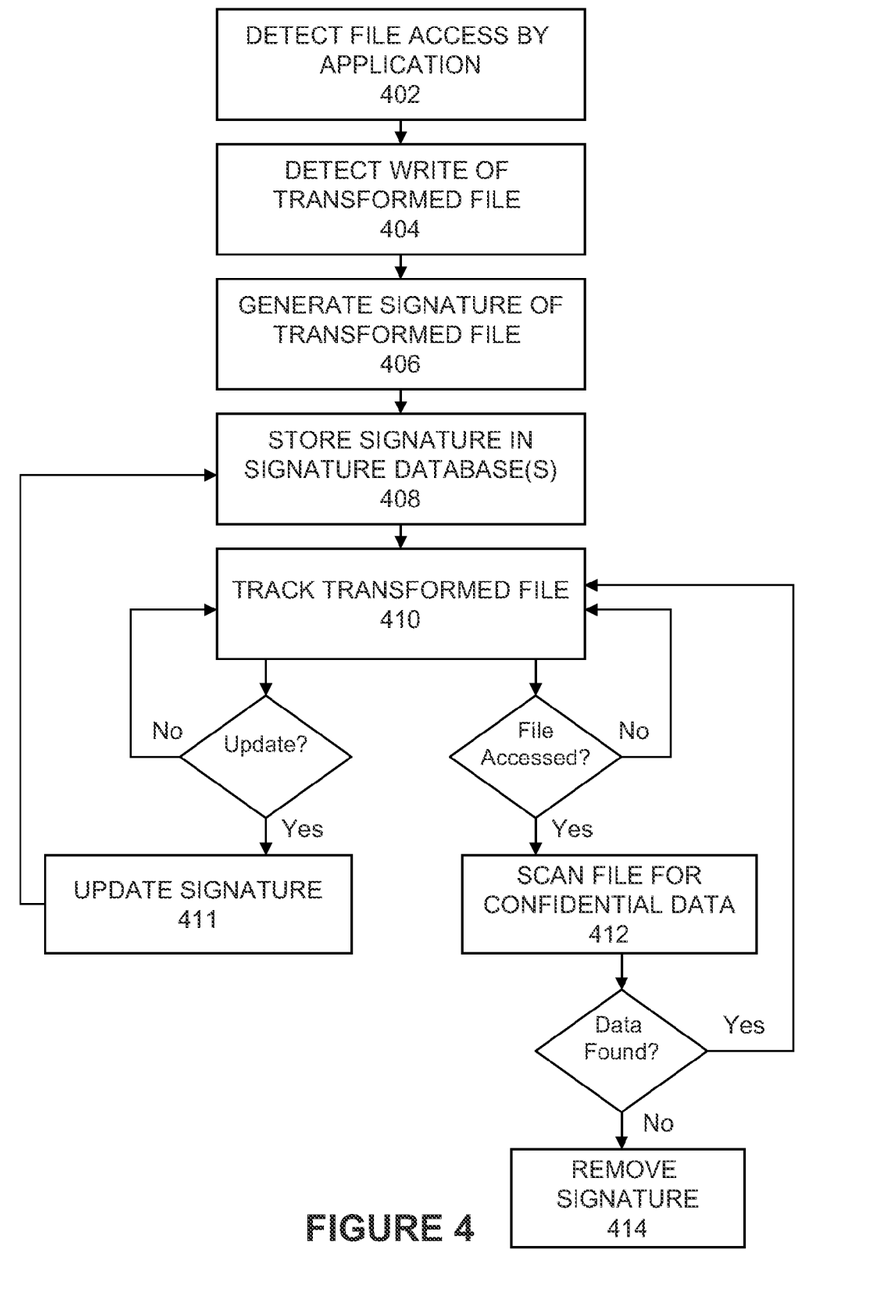
FIG. 4 is a flowchart illustrating steps performed by the security module 120 to detect and track transformed files containing confidential data, according to one embodiment of the present invention.

Referring now to FIG. 4, there is shown a flowchart illustrating the operation of the security module 120, according to some embodiments of the present invention. Specifically, FIG. 4 illustrates the steps of the security module 120 involving detecting and tracking transformed files containing confidential data. It should be understood that these steps are illustrative only. Different embodiments of the security module 120 may perform the illustrated steps in different orders, omit certain steps, and/or perform additional steps not shown in FIG. 4 (the same is true for FIG. 5).

As shown in FIG. 4, the security module 120 detects 402 that an application has accessed a file that contains confidential information. The module 120 further detects 404 that the application wrote a transformed file that contains content inaccessible to DLP applications. The transformed file is suspected to contain at least a portion of the confidential information. The module 120 further generates 406 a signature for the transformed file based on the inaccessible content. The module 120 also stores 408 the signature in a signature database containing a plurality of signatures of transformed files. Again, the signature can be stored in local signature database, such as signature database 113 associated with the clients 110. The signature can also be stored in a central database, such as signature 111 associated with the server 116 or another central database.

The module 120 further tracks 410 the transformed file for which the signature was generated. If the transformed file is modified or another action is taken that may require the signature to be updated for the file, the module 120 can determine if an update is needed. If so, the module 120 can then update 411 the signature and any other historical information stored for the file. Similarly, the updating 411 can include generating a new signature for the file or for a portion of the file (e.g., if the file is segmented into pieces which each require a signature). In addition, the module 120 can detect if the transformed file has been accessed again by an application. If the file has been accessed, the module 120 can scan 412 the file for confidential data. As explained above, the transformed file is suspected to contain confidential data since the file was written by an application while that application was reading a file known to contain confidential data. However, it is possible that the transformed file actually does not contain confidential data. For example, the writing of the transformed file may have been unrelated to the reading of the confidential data file, or the confidential data may have been removed or not included in the writing process. Thus, once the file is opened, the module 120 has an opportunity to scan 412 the file to confirm whether confidential information is present. If not, the module 120 can remove 414 the signature for the transformed file from storage. If so, the module 120 can keep the signature stored for the application and resume tracking 410 of the file. In some embodiments, the module 120 records that the transformed file has been confirmed to contain confidential data.

Figure 5:
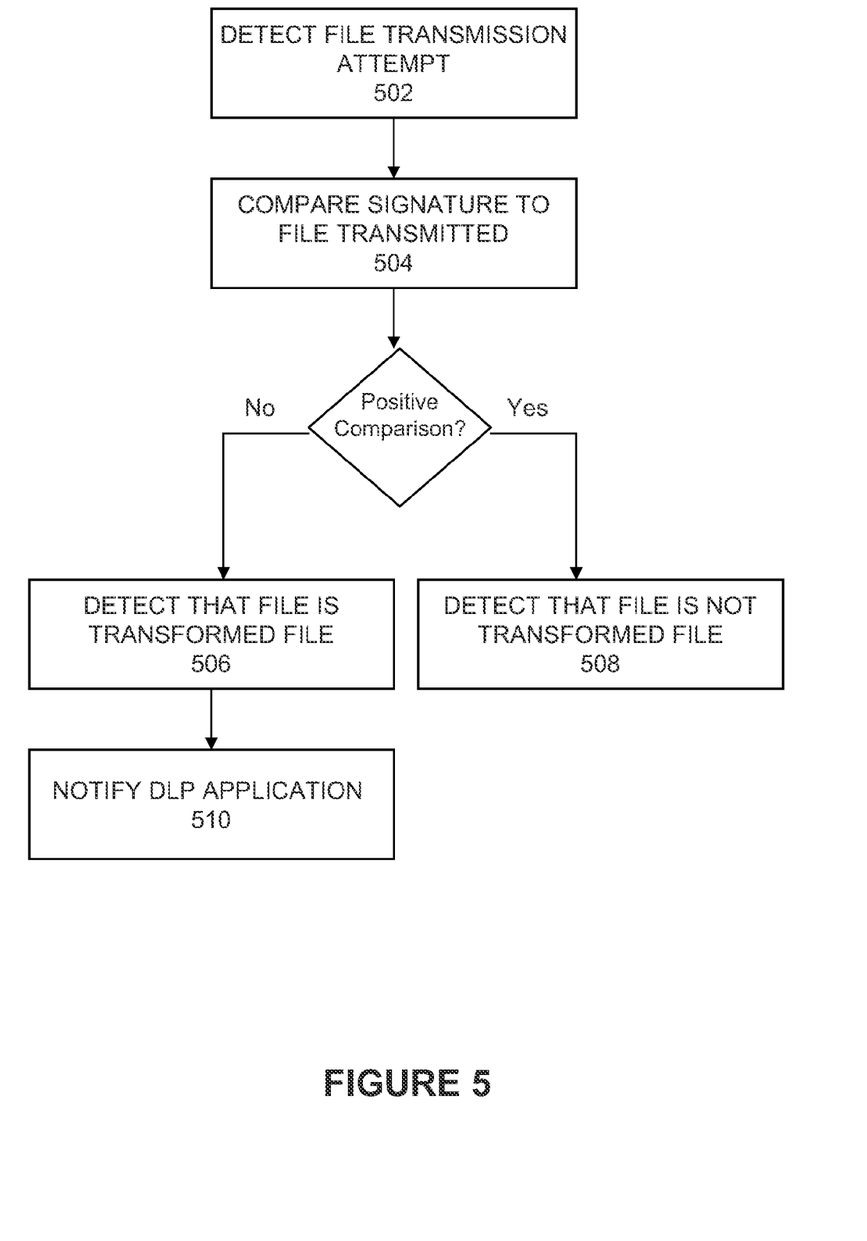
FIG. 5 is a flowchart illustrating steps performed by the detection module 130 to detect transformed files being transmitted from computers, according to one embodiment of the present invention.

Referring now to FIG. 5, there is shown a flowchart illustrating the operation of the detection module 130, according to some embodiments of the present invention. Specifically, FIG. 5 illustrates the steps of the detection module 130 involving detection of transformed files being transmitted from computers.

In some embodiments, the detection module 130 detects 502 an attempt to transmit via a network a file that cannot be accessed by DLP applications. The module 130 compares 504 the signature generated to files transmitted via a network, where the transmitted files contain content inaccessible to the DLP applications. If a positive comparison is made between the signature generated and a transmitted file, the module 130 detects 506 that the file is the transformed file. If a negative comparison is made, the module 130 detects 508 that the file is not the transformed file. The module 130 can thus compare files being transmitted via a network 112 against the local signature database 113 and/or the central signature database 111 to determine if there are any matches to any signatures. Where the module 130 detects 506 that the file is a transformed file, the module 130 can take action or can notify 510 the DLP application of the problem, and the appropriate data-management policy can be applied regarding that file.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer-implemented method of detecting and tracking transformed files suspected to contain confidential information and inaccessible by a Data Loss Prevention (DLP) application, the method comprising:
    detecting, by a computer, that an application has accessed a file that contains confidential information;
    detecting, by the computer, that the application wrote a transformed file that contains content inaccessible to the DLP application, the transformed file suspected to contain at least a portion of the confidential information;
    generating, by the computer, a signature for the transformed file containing the inaccessible content, the signature stored in a signature database containing a plurality of signatures of transformed files;
    comparing, by the computer, the signature generated to files transmitted via a network, wherein the transmitted files contain content inaccessible to the DLP application; and
    responsive to a comparison indicating that the signature matches a file transmitted via the network, detecting, by the computer, that matched file is the transformed file.

2. The method of claim 1, wherein detecting that the application wrote a transformed file further comprises detecting, by the computer, that the file has been converted to a password-protected file.

3. The method of claim 1, wherein detecting that the application wrote a transformed file further comprises:
    detecting, by the computer, that the application on a computer has accessed the file containing confidential information;
    detecting, by the computer, that the application has written content to a second file while the file containing confidential information was being accessed; and
    determining, by the computer, that contents of the second file cannot be accessed by DLP applications associated with the computer.

4. The method of claim 1, wherein generating a signature further comprises taking a hash of the transformed file, and wherein the method further comprises:
    providing, by the computer, the hash for storage locally in the signature database for detection of attempted transmission of transformed files from a computer; and
    transmitting, by the computer, the hash for storage in a central database for detection of attempted transmission of transformed files from other computers.

5. The method of claim 1, further comprising:
    tracking, by the computer, the transformed file for which the signature was generated; and
    detecting and tracking, by the computer, additional modifications to made to the transformed file.

6. The method of claim 1, further comprising:
    detecting, by the computer, an attempt to transmit from a computer a file that contains content inaccessible to DLP applications;
    comparing, by the computer, the file that contains inaccessible content to signatures stored in a central database for a match between the file that contains inaccessible content and the signatures, the central database containing a plurality of signatures of transformed files which were transformed on computers other than the computer from which the attempted file transmission occurred; and
    responsive to a positive match, detecting, by the computer, the file that contains inaccessible content to be a transformed file suspected to contain confidential data.

7. The method of claim 1, further comprising:
    tracking, by the computer, the transformed file for which the signature was generated;
    detecting, by the computer, that an application has opened the transformed file;
    scanning, by the computer, the contents of the transformed file while open to determine whether the transformed file really does contain confidential data; and
    responsive to determining that the transformed file does not contain confidential data, removing, by the computer, the signature for the transformed file from the signature database.

8. A computer-readable storage medium storing executable computer program instructions for detecting and tracking transformed files suspected to contain confidential information and inaccessible by a Data Loss Prevention (DLP) application, the computer program instructions that when executed by a computer cause the computer to perform steps comprising:
    detecting that an application has accessed a file that contains confidential information;
    detecting that the application wrote a transformed file that contains content inaccessible to the DLP application, the transformed file suspected to contain at least a portion of the confidential information;

generating a signature for the transformed file containing the inaccessible content, the signature stored in a signature database containing a plurality of signatures of transformed files;

comparing the signature generated to files transmitted via a network, wherein the transmitted files contain content inaccessible to the DLP application; and responsive to a comparison indicating that the signature matches a file transmitted via the network, detecting that matched file is the transformed file.

9. The computer program product of claim 8, wherein detecting that the application performed a transformation on the file further comprises detecting that the file has been copied to a password-protected container file.

10. The computer program product of claim 8, wherein detecting that the application performed a transformation on the file further comprises:

detecting that the application on a computer has accessed the file containing confidential information;

detecting that the application has written content to a second file while the file containing confidential information was being accessed; and determining that DLP applications associated with the computer are unable to access contents of the second file and have failed to generate a detection incident regarding the second file.

11. The computer program product of claim 8, wherein generating a signature further comprises taking a hash of the file, and wherein the signature database is a central database to which the hash is transmitted for storage and for later use in detection of attempted transmission of transformed files from a plurality of computers.

12. The computer program product of claim 8, further comprising:

tracking the transformed file for which the signature was generated as the transformed file is accessed by different applications; and detecting and tracking additional modifications to made to the transformed file.

13. The computer program product of claim 8, further comprising detecting an attempt to transmit from a computer a transformed file that contains content inaccessible to DLP applications, wherein the computer on which the transmission attempt is made is a different computer from the one on which the transformation of the file occurred, and wherein the comparison of the signature generated to files being transmitted occurs using a central database storing the signatures for the transformed files.

14. The computer program product of claim 8, further comprising detecting an attempt to transmit from a computer a transformed file that is inaccessible to DLP applications, wherein the computer on which the transmission attempt is made does not have a DLP application installed on the computer, and wherein the detection that one of the comparison of the signature generated to files being transmitted occurs using a central database storing the signatures for the transformed files.

15. A computer system for detecting and tracking transformed files suspected to contain confidential information and inaccessible by a Data Loss Prevention (DLP) application the system comprising:

a processor; and a computer-readable storage medium storing executable software modules comprising computer executable instructions that when executed by a computer cause the computer to perform steps comprising:

detecting that an application has accessed a file that contains confidential information;

detecting that the application wrote a transformed file that contains content inaccessible to the DLP application, the transformed file suspected to contain at least a portion of the confidential information;

generating a signature for the transformed file containing the inaccessible content, the signature stored in a signature database containing a plurality of signatures of transformed files;

comparing the signature generated to files transmitted via a network, wherein the transmitted files contain content inaccessible to the DLP application; and responsive to a comparison indicating that the signature matches a file transmitted via the network, detecting that matched file is the transformed file.

16. The system of claim 15, wherein detecting that the application wrote a transformed file further comprises detecting converting of the file to an encrypted file that contains at least a portion of the confidential data of the file.

17. The system of claim 15, wherein detecting that the application wrote a transformed file further comprises detecting copying of the file into a second file to which encryption is applied, the second file that is encrypted containing at least a portion of the confidential data of the file.

18. The system of claim 15, further comprising tracking the transformed file for which the signature was generated and detecting and tracking additional modifications to made to the transformed file.

19. The system of claim 15, further comprising detecting an attempt to transmit from a computer a transformed file that is inaccessible to DLP applications, wherein the transmission attempt is made on a different computer from the computer on which the transformation of the file occurred, and wherein the transformed file detection module is configured to detect that one of the files being transmitted is the transformed file using a central database storing the signatures for the transformed files.

20. The system of claim 15, further comprising:

tracking the transformed file for which the signature was generated;

detecting that an application has opened the transformed file;

scanning the contents of the transformed file while open to determine whether the transformed file really does contain confidential data; and removing the signature for the transformed file from the signature database in response to determining that the transformed file does not contain confidential data.

* * * * *